Jan. 20, 1925 Re. 15,984

C. H. KNUDSEN

INTERNAL COMBUSTION ENGINE

Original Filed April 26, 1920 2 Sheets-Sheet 1

INVENTOR
Carl H. Knudsen
BY
Howard C. Thompson
ATTORNEY

Jan. 20, 1925. Re. 15,984

C. H. KNUDSEN

INTERNAL COMBUSTION ENGINE

Original Filed April 26, 1920 2 Sheets-Sheet 2

INVENTOR
Carl H. Knudsen
BY
Howard C. Thompson
ATTORNEY

Reissued Jan. 20, 1925.

Re. 15,984

UNITED STATES PATENT OFFICE.

CARL H. KNUDSEN, OF BROOKLYN, NEW YORK, ASSIGNOR TO THE KNUDSEN MOTOR CORPORATION, OF WILMINGTON, DELAWARE, A CORPORATION OF DELAWARE.

INTERNAL-COMBUSTION ENGINE.

Original application filed April 26, 1920, Serial No. 376,548. Renewed September 30, 1922, Serial No. 591,666. Original No. 1,470,752, dated October 16, 1923. Application for reissue filed June 25, 1924. Serial No. 722,414.

*To all whom it may concern:*

Be it known that I, CARL H. KNUDSEN, a citizen of the United States, and residing at Brooklyn, in the county of Kings and State of New York, have invented new and useful Improvements in Internal-Combustion Engines, of which the following is a specification, such as will enable those skilled in the art to which it appertains to make and use the same.

This invention relates to internal combustion engines and particularly to what are known as fuel oil engines designed to be used for marine and similar purposes, and the object of the invention is to provide an engine of the class specified of a high compression type which is so made as to simplify the construction of such engines thus materially reducing the cost of the manufacture of the same; a further object being to provide a two-cycle V-type engine having a single compression and combustion chamber, one of the cylinders acting as an intake or scavenger cylinder and the other as an exhaust cylinder; a further object being to provide an engine of the class and for the purpose specified with means for pumping air into the cylinders and crank cases of the engine to increase the pressure of the air in said cylinders and crank cases beyond the atmospheric pressure to provide for a more perfect scavenging action; and with these and other objects in view the invention consists in an engine of the class and for the purpose specified which is simple in construction and operation and efficient in use and constructed and operated as hereinafter described and claimed.

The invention described and claimed herein is an improvement on that shown and described in a prior application filed by me May 7, 1919, Serial No. 295,385, and is fully disclosed in the following specification, of which the accompanying drawing forms a part, in which the separate parts of my improvement are designated by suitable reference characters in each of the views, and in which:—

Figures 1, 2:
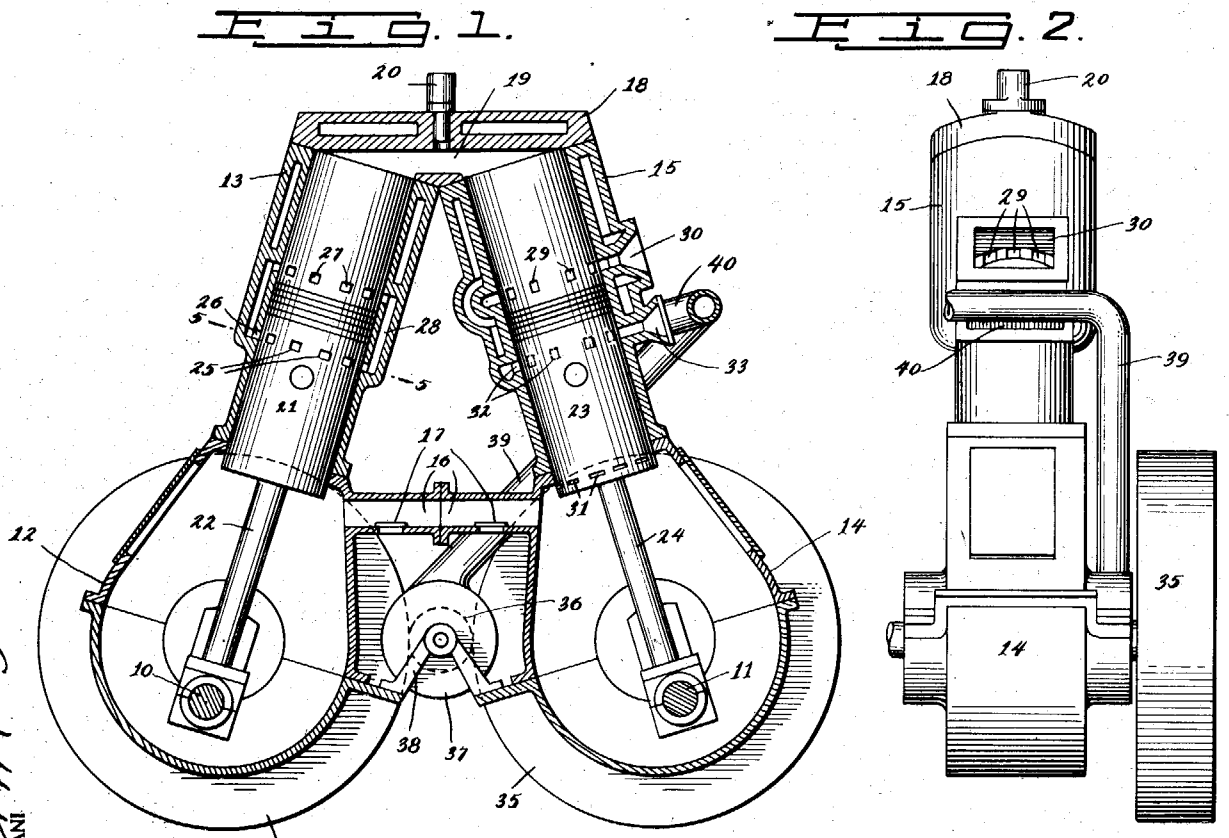
Fig. 1 is a transverse sectional view of two of the cylinders and crank cases of my improved engine.
Fig. 2 is a side view of the construction as shown in Fig. 1.
Figure 3:
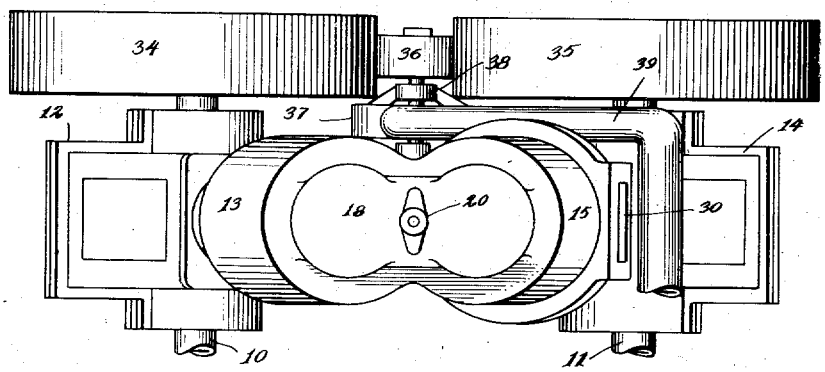
Figure 4:
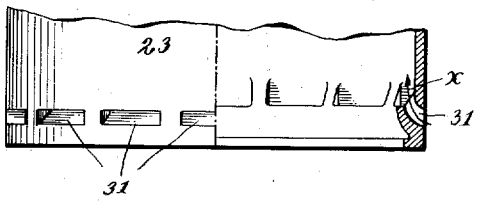
Figure 5:
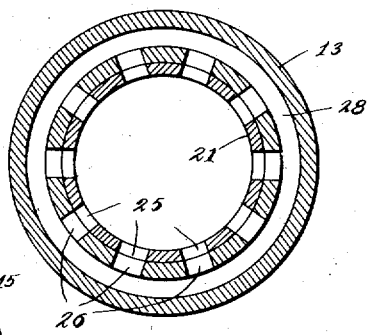
Figure 6:
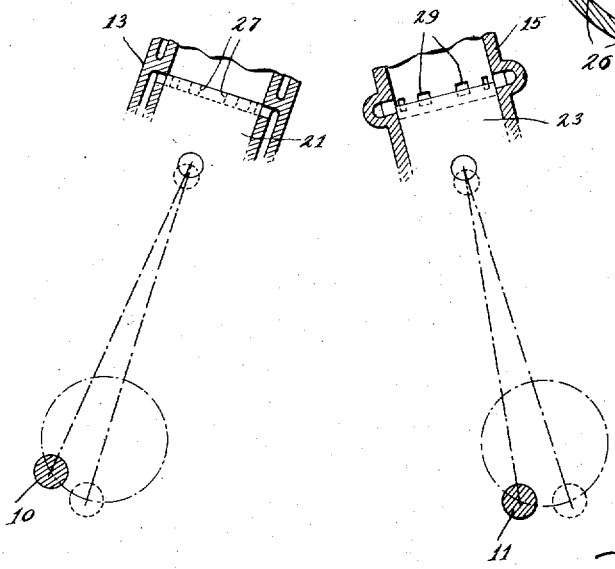

Fig. 3 a plan view of the construction shown in Figs. 1 and 2;

Fig. 4 an enlarged detail view of the lower end portion of one of the pistons which I employ, with part of the construction broken away and in section;

Fig. 5 a partial section on the line 5—5 of Fig. 1 and on an enlarged scale; and, Fig. 6 a diagrammatic view illustrating the relative positions of the piston in the scavenger and exhaust cylinders.

In Figs. 1 to 3 inclusive, I have shown two of the cylinders and crank cases of my improved engine, but it will be understood that any number of such cylinders and crank cases may be employed in the construction of a complete engine, and in said figures I have shown at 10 and 11 two crank shafts of the engine, which are spaced apart and extend parallel one with the other. The crank shaft 10 passes into and through a crank case 12 carrying a cylinder 13, and the crank shaft 11 passes into and through a crank case 14 carrying a cylinder 15. The crank cases 12 and 14 are placed in communication through a port or passage 16 having suitable air inlet valves 17. The tops of the cylinders 13 and 15 are closed by a cylinder head 18 having a combustion chamber 19 which communicates with both of the cylinders 13 and 15, and the cylinder head 18 is provided with a suitable fuel injecting device 20 through which fuel is adapted to be sprayed into the combustion chamber 19 in the usual manner.

Mounted in the cylinder 13 is a piston 21 having a connecting rod 22 secured to one of the cranks of the crank shaft 10 in the usual manner, and mounted in the cylinder 15 is a piston 23 having a connecting rod 24 which connects with a crank of the crank shaft 11.

The piston 21 in the cylinder 13 is provided adjacent to its upper end with a plurality of circumferentially arranged ports or passages 25, which open inwardly and outwardly through said piston as clearly shown in Fig. 5, and these ports or passages are adapted to register with similar ports or passages 26 in the cylinder 13. The cylinder 13 is also provided with other or intake ports or passages 27 similar to the ports or passages 26 but located at a predetermined distance above the ports or passages 26 and placed in communication therewith by an annular by-pass 28 in the wall of the cylinder 13. It will be seen from the foregoing description that when the piston 21 is in the position shown in Fig. 1 of the drawing, the air under slight pressure in the crank cases 12 and 14 is free to pass through the ports or passages 25 and 26 into the annular by-pass 28 and into the cylinder 13 through the intake ports or passages 27, and thus through the cylinder head 18 and cylinder 15, and to be discharged from the cylinder 15 through a plurality of annularly arranged exhaust ports or passages 29 in communication with an exhaust port 30 in the cylinder 15. This construction provides a perfect scavenging action and will thoroughly clean out the cylinders 13 and 15 as well as the combustion chamber 19.

The piston 23 is provided adjacent to the lower end thereof with a plurality of annularly arranged ports or passages 31, which are shown in detail in Fig. 4 of the drawing, and these ports or passages open outwardly and inwardly through the piston and are so constructed as to direct the air passed therethrough upwardly into the piston 23, as indicated by the arrow $x$ in Fig. 4. When the piston 23 is in its raised position, the ports or passages 31 will register with air intake ports or passages 32 in the cylinder 15, said ports or passages communicating with an air intake port 33.

Mounted on one end portion of each of the crank shafts 10 and 11 are fly-wheels 34 and 35 respectively, and mounted between the adjacent faces of said fly-wheel is a friction disk or roller 36, which is mounted on the shaft of an air pump device 37 supported in suitable brackets 38, which are mounted in connection with the crank cases 12 and 14. The air pump device 37 may be of the usual or any preferred form and construction and, in practice, an air pipe 39 is in communication with the pump device 37 and placed in communication with the air intake port 33 of the cylinder 15 as shown at 40 in Fig. 1 of the drawing.

From the foregoing description it will be seen that in the operation of the engine, the fly-wheels 34 and 35 will operate the air pump device 37 through the friction disk or roller 36 to pump the air into the crank cases 12 and 14 when the piston 23 is in its raised position, or the ports 31 thereof in line with the air intake ports or passages 32 of said cylinder device increasing the pressure of the air in the crank cases 12 and 14 beyond the atmospheric pressure, whereby when the pistons 21 and 23 move into the position shown in Fig. 1 a perfect scavenging action will be produced and a fresh charge of air supplied to the cylinders 13 and 15, which air is compressed to a high degree in the upward movement of the pistons 21 and 23, thus producing a high compression engine of the class described.

I also preferably advance the crank of the crank shaft 11 a slight degree over that of the crank of the crank shaft 10, as is diagrammatically illustrated in Fig. 6, so that the piston 23 in the cylinder 15 will in its downward movement open the exhaust ports or passages 29 in advance of the opening of the intake ports or passages 27 in the cylinder 13 but in the upward movement of the pistons 21 and 23, the intake and exhaust ports or passages 27 and 29 will be closed at approximately the same time, and this, as will be apparent, will also aid in the scavenging action of the engine and will permit of a thorough cleaning out of the cylinders and cylinder head.

It will be apparent that while I have shown but two cylinders, or one pair of cylinders of an engine that the complete engine will be composed of a series or predetermined number of such pair of cylinders, each pair of which will be constructed in the same manner as the single pair herein shown and described, and coupled with and operated by the crank shafts 10 and 11 in the usual manner, and as the various details of the complete engine form no part of this invention they have not been shown nor described, the distinctive features consisting in the particular method of producing the scavenging action, the introduction of air into the crank cases 12 and 14 by a pump or similar device to increase the pressure of the air in said crank cases, and the advancement of the crank on the crank shaft which operates the piston in the exhaust cylinder, and while I have shown certain details of construction for carrying my invention into effect, it will be understood that I am not necessarily limited to these details and various changes therein and modifications thereof may be made, within the scope of the appended claims, without departing from the spirit of my invention or sacrificing its advantages.

Having fully described my invention, what I claim as new and desire to secure by Letters Patent, is:—

1. In an engine of the class described, a pair of cylinders connected by a cylinder head having a combustion chamber in communication with said cylinder, a crank case at the bottom of each of said cylinders, means for placing said crank cases in communication, crank shafts passed through said crank cases, pistons in said cylinders and in operative connection with said crank shafts, and means for passing air under pressure into and through one of said pistons and cylinders, and into the crank cases of the separate cylinders to increase the pressure of air therein.

2. In an engine of the class described, a pair of cylinders connected by a cylinder head having a combustion chamber in communication with said cylinders, a crank case at the bottom of each of said cylinders and in communication with each other, crank shafts passed through said crank cases, pistons in said cylinders and in operative connection with said crank shafts, means whereby in the upward movement of said pistons air will be sucked into said crank cases, and means for admitting air under pressure into said crank cases through one of said pistons when said piston is in its uppermost positon.

3. A V-type engine of the class described comprising a pair of cylinders, a cylinder head having a combuston chamber placed in communication with each of said cylinders, crank cases at the bottom of said cylinders having a port or passage for placing said crank cases in communication, one of said cylinders being provided with intake ports or passages and the other of said cylinders with exhaust ports or passages, a piston mounted in said first named cylinder and adapted to control the intake ports or passages therein, means in said piston and said cylinder whereby air under pressure in said crank cases is adapted to pass through said piston and cylinder, and into said cylinder above the piston through said intake ports or passages, a piston in the second named cylinder and adapted to control the exhaust ports or passages therein, and means in said last named piston and said cylinder whereby air under pressure may be supplied to said crank cases through said piston in one position thereof.

4. An engine of the class described comprising a pair of cylinders joined by a cylinder head having a combustion chamber in communication with said cylinders, crank cases at the bottom of said cylinders, and in communication with each other, crank shafts passed through said crank cases, pistons in said cylinders and in operative connection with the cranks of said crank shafts, fly-wheels mounted on said crank shafts, an air pump device, means for operating said air pump device through said fly-wheels, means for placing said pump device in communication with one of said cylinders, and means on said cylinder and in the piston mounted therein whereby in one position of said piston air may be forced into said crank cases by said pump device.

5. An engine of the class described comprising a pair of cylinders joined by a cylinder head having a combustion chamber in communication with said cylinders, crank cases at the bottom of said cylinders and in communication with each other, crank shafts passed through said crank cases, pistons in said cylinders and in operative connection with the cranks of said crank shafts, fly-wheels mounted on said crank shafts, an air pump device, means for operating said air pump device through said fly-wheels, means for placing said pump device in communication with the crank case end portion of one of said cylinders, means in said cylinder and in the piston mounted therein whereby in one position of said piston air may be forced into said crank cases by said pump device, and means in the other of said pistons and the cylinder thereof whereby air under pressure in said crank cases is adapted to pass through said piston and into said cylinder through intake ports or passages.

6. An engine of the class described comprising a pair of cylinders joined by a cylinder head having a combustion chamber in communication with said cylinders, crank cases at the bottom of said cylinders and in communication with each other, crank shafts passed through said crank cases, pistons in said cylinders and in operative connection with the cranks of said crank shafts, fly-wheels mounted on said crank shafts, an air pump device, means for operating said air pump device through said fly-wheels, means for placing said pump device in communication with the crank case end portion of one of said cylinders, means in said cylinder and in the piston mounted therein whereby in one position of said piston air may be forced into said crank cases by said pump device, means in the other of said pistons and the cylinders thereof whereby air under pressure in said crank cases is adapted to pass through said piston and into said cylinder through intake ports or passages, and the other or first named cylinder being provided with exhaust ports or passages controlled by the piston mounted in said cylinder.

7. An engine of the class described comprising a pair of cylinders joined by a cylinder head having a combustion chamber in communication with said cylinders, crank cases at the bottom of said cylinders and in communication with each other, crank shafts passed through said crank cases, pistons in said cylinders and in operative connection with the cranks of said crank shafts, fly-wheels mounted on said crank shafts, an air pump device, means for operating said air pump device through said fly-wheels, means for placing said pump device in communication with the crank case end portion of one of said cylinders, means in said cylinder and in the piston mounted therein whereby in one position of said piston air may be forced into said crank cases by said pump device, means in the other of said pistons and the cylinders thereof whereby air under pressure in said crank cases is adapted to pass through said piston and into said cylinder through intake ports or passages, the other or first named cylinder being provided with exhaust ports or passages controlled by the piston mounted in said cylinder, and means whereby said piston will open the exhaust ports or passages in advance of the opening of said intake ports or passages.

8. An engine of the class described comprising a pair of cylinders, one of said cylinders being provided with intake ports or passages and the other with exhaust ports or passages, crank cases at the bottom of said cylinders, and in communication with each other, pistons mounted in said cylinders and adapted to control the intake and exhaust ports or passages thereof, the piston of said last named cylinder being provided with ports or passages adapted to register with air intake ports in said cylinder, means for supplying air to said air intake ports and through the ports or passages in said piston to said crank cases, said first named cylinder being provided with auxiliary ports or passages in communication with said intake ports or passages through an annular by-pass, and the piston of said cylinder being provided with ports or passages which open inwardly and outwardly therethrough and which are adapted to register with the auxiliary ports or passages of said cylinder whereby air under pressure from the crank cases is adapted to pass through said piston into said cylinder through said intake ports or passages.

9. In an engine employing two cylinders, having a common combustion chamber, pistons in said cylinders and two crank shafts, means for coupling the crank of one of said crank shafts to one piston and the crank of the other shaft to the other piston, and the crank of one shaft being in advance of that of the other shaft whereby one piston is operated in advance of the other.

10. In an engine, a cylinder structure having a pair of cylinders having a common combustion chamber, intake ports in one cylinder and exhaust ports in the other cylinder, pistons in said cylinders for controlling the ports therein, independent crank shafts for said pistons, the crank of one shaft being in advance of the crank of the other and said pistons beng coupled with and actuated by said cranks whereby one piston is operated slightly in advance of the other piston in the cylinder structure.

11. In an engine employing two crank shafts mounted in substantially parallel relation, pairs of cylinders disposed longitudinally of said shafts, pistons in said cylinders, the pistons in each pair of cylinders being operated by independent crank shafts and the oppositely disposed cranks of said crank shafts being one in advance of the other whereby one piston in each pair of cylinders is operated in advance of the other piston in said pair.

12. In a two cycle engine, a cylinder structure comprising pairs of cylinders converging to the head ends thereof and a common combustion chamber for the separate pair of cylinders, intake ports in one cylinder of each pair and exhaust ports in the other cylinder of each pair, pistons in the separate cylinders and controlling the ports therein, two crank shafts mounted beneath and extending longitudinally of one of the cylinders in each pair, the cranks of said shafts being coupled with and adapted to actuate said pistons and the oppositely disposed cranks of said shafts being one in advance of the other whereby the piston controlling the exhaust ports in each pair of cylinders is operated in advance of the piston controlling the intake ports in the other cylinder of each pair.

13. In an engine, a cylinder structure comprising pairs of cylinders and common combustion chambers for the separate pairs of cylinders, intake ports in one cylinder of each pair and exhaust ports in the other cylinder of each pair, pistons in the separate cylinders and controlling the ports therein, two crank shafts mounted beneath and extending longitudinally of one of the cylinders of each pair, the cranks of said shafts being coupled with and adapted to actuate said pistons and the oppositely disposed cranks of said shafts being one in advance of the other whereby the piston controlling the exhaust ports in each pair of cylinders is operated in advance of the piston controlling the intake ports in the other cylinder of each pair.

14. In an engine, two crank shafts disposed in substantially parallel relation, oppositely disposed cranks on said shafts being one in advance of the other whereby two pistons in a dual cylinder structure coupled with said oppositely disposed cranks may be operated one in advance of the other in the cylinder structure.

In testimony that I claim the foregoing as my invention I have signed my name, this 21st day of June, 1924.

CARL H. KNUDSEN.